United States Patent [19]

Swenson et al.

[11] Patent Number: 5,541,921

[45] Date of Patent: Jul. 30, 1996

[54] ISOCHRONOUS SERIAL TIME DIVISION MULTIPLEXER

[75] Inventors: Erik R. Swenson; Paul Foster, both of San Jose, Calif.

[73] Assignee: National Semiconductor Corporation, Santa Clara, Calif.

[21] Appl. No.: 349,977

[22] Filed: Dec. 6, 1994

[51] Int. Cl.$^6$ ........................................ H04Q 11/08
[52] U.S. Cl. ................................ 370/68; 370/112
[58] Field of Search ........................ 370/58.1, 58.2, 370/66, 58.3, 65.5, 67, 68, 112

[56] References Cited

U.S. PATENT DOCUMENTS

| | | | |
|---|---|---|---|
| 3,924,079 | 12/1975 | Garrett | 370/112 |
| 4,131,763 | 12/1978 | Herschtal | 370/66 |
| 4,258,434 | 3/1981 | Glowinski et al. | 370/60 |
| 4,570,258 | 2/1986 | McCracken | 370/66 |
| 4,689,784 | 8/1987 | Whitesel | 370/112 |
| 4,788,680 | 11/1988 | Kikuchi et al. | 370/112 |
| 5,040,173 | 8/1991 | Richards | 370/58.1 |
| 5,040,174 | 8/1991 | Takeuchi et al. | 370/112 |
| 5,311,506 | 5/1994 | Beisel | 370/58.1 |

FOREIGN PATENT DOCUMENTS

| | | | |
|---|---|---|---|
| 4004956 | 8/1991 | Germany . | |
| 004004956 | 8/1991 | Germany | 370/58.1 |

Primary Examiner—Hassan Kizou
Assistant Examiner—Seema S. Rao
Attorney, Agent, or Firm—Limbach & Limbach L.L.P.

[57] ABSTRACT

A serial time division multiplexer routes data from a plurality of isochronous data sources to a plurality of isochronous data sinks without buffering the data in a random-access memory by utilizing a plurality of selectors that each select predetermined time slots from a plurality of incoming isochronous data streams. Each selector selects which time slots are to be received in response to a sequence of selection codes. A control stage controls the timing of the selection codes so that each selector receives a selection code when the time slot that corresponds to that selection code is received.

19 Claims, 6 Drawing Sheets

ISOCHRONOUS SERIAL TIME DIVISION MULTIPLEXER

BACKGROUND OF THE INVENTION

1. Field of the Invention

The present invention relates to an isochronous serial time division multiplexer and, in particular, to an isochronous serial time division multiplexer that routes isochronous data without buffering the data in a random-access memory.

2. Description of the Related Art

An isochronous time division switch is a device that routes the isochronous data output from a plurality of isochronous data sources to a plurality of isochronous data sinks. In general terms, isochronous data sources and sinks are devices, such as video cameras and telephones, that continuously transmit or receive data at a constant data rate.

When the data rate required by a particular isochronous data source is relatively small, the data from several isochronous data sources can be interleaved together so that the data from each of the sources can be effectively transferred at the same time.

Conventionally, an eight kilohertz framing signal is utilized to form a continuous series of 125 μS frames which, in turn, are divided into a series of time slots. Each time slot then defines the boundaries for a portion of the data which is output from an isochronous data source. Thus, for example, the first, fourth, and seventh time slots of each frame could contain data from one isochronous data source, while the second, fifth, and eighth time slots contain data from another isochronous data source.

Figure 1:
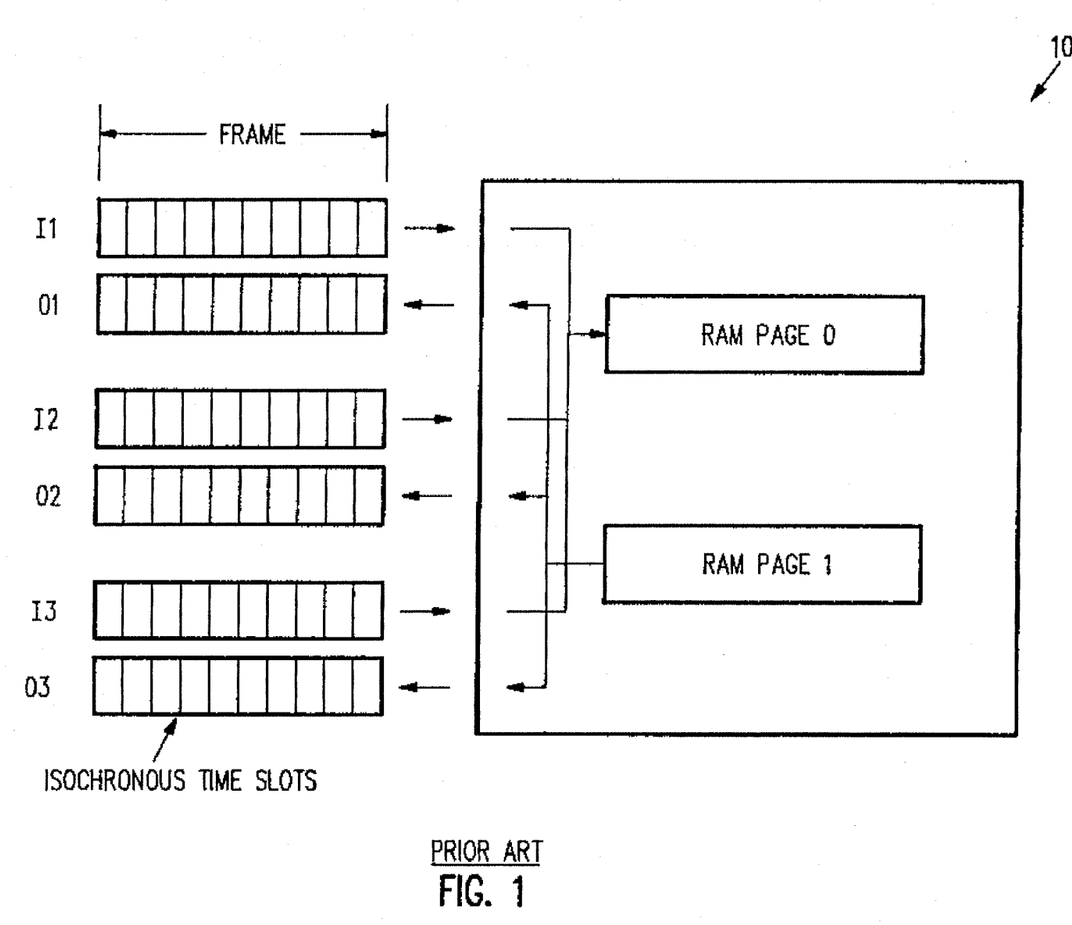
FIG. 1 is a block diagram illustrating a conventional isochronous time division switch 10.

An isochronous time division switch, in turn, routes the data in each of the time slots from several input streams of data to several output streams of data. FIG. 1 shows a block diagram that illustrates a conventional isochronous time division switch 10.

As shown in FIG. 1, switch 10 receives three input streams of isochronous data I1–I3, and forms three output streams of isochronous data O1–O3. For purposes of illustration, only one frame of data is shown for each stream of data I1–I3 and O1–O3, and each frame of data is divided into 10 time slots.

In operation, switch 10 receives and stores the data contained in each of the time slots that form one frame of data from each of the input streams of data I1–I3 in one of the two pages of random-access-memory (RAM). Thus, for example, the data contained within all 30 time slots (3 data streams each having 10 time slots each in one frame of data) could be stored in RAM page 0.

Once completed, RAM page 0 and RAM page 1 are switched on the 125 μS frame boundary so that the data contained in each of the time slots that form the next frame of data from each of the input streams of data I1–I3 are stored in RAM page 1. At the same time, the data stored in RAM page 0 is output into the time slots of the three output streams of data O1–O3.

The advantage of this type of scheme where the two pages of RAM take turns receiving and transmitting data is that the mapping relationship between the incoming and outgoing time slots is completely arbitrary. As a result, the data which is contained within one of the input time slots can be output in any of the time slots of any of the output data streams O1–O3. Thus, for example, the data within the second time slot of input stream I2 could be output in the first time slot of output stream O1, the fifth time slot of output stream O2, and/or the third time slot of output stream O3.

One problem with this dual-RAM type of multiplexing, however, is that a significant amount of RAM is required to hold the data from all of the time slots from one frame of data. Since RAM is costly, there is a need for a time division switch that can operate without the RAM.

SUMMARY OF THE INVENTION

The present invention provides an isochronous serial time division multiplexer that routes data from an isochronous data source to an isochronous data sink without buffering the data in a random-access memory (RAM). As a result, the multiplexer of the present invention eliminates the need for the RAM which is required by conventional serial time division switches.

A serial time division multiplexer in accordance with the present invention includes a selector that receives a series of time slots from each of a plurality of incoming streams of data, and a corresponding series of selection codes that each identify a time slot from an incoming stream of data. In addition, the selector passes the time slot identified by each selection code. The multiplexer of the present invention also includes a connection memory and a control stage. The connection memory stores the series of selection codes, and outputs the selection code identified by a selection code address in response to a request signal. The control stage outputs the request signal and the selection code addresses so that each selection code output by the connection memory identifies a time slot from an incoming stream of data.

A better understanding of the features and advantages of the present invention will be obtained by reference to the following detailed description and accompanying drawings which set forth an illustrative embodiment in which the principals of the invention are utilized.

DETAILED DESCRIPTION

Figure 2:
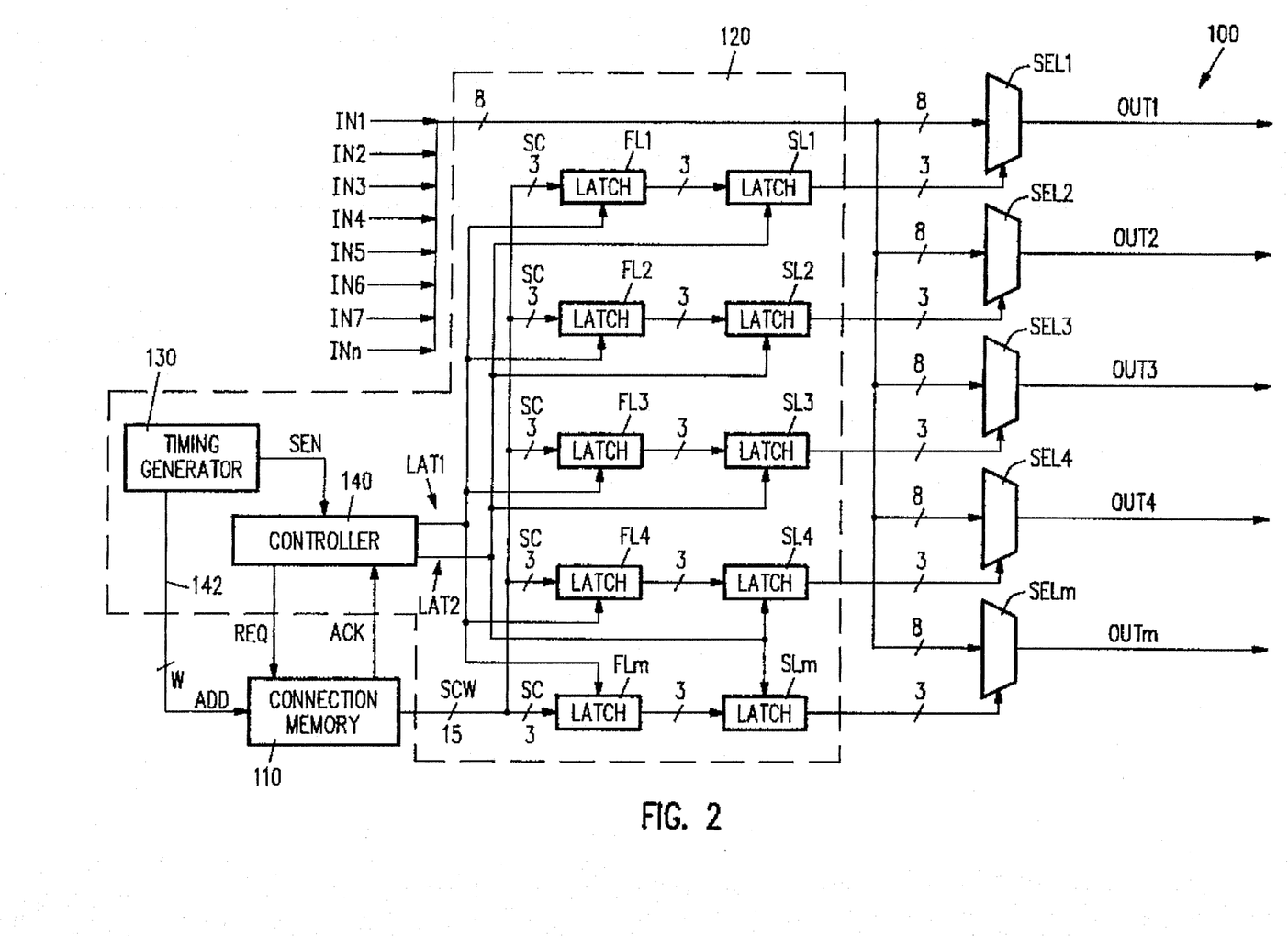
FIG. 2 is a block diagram illustrating a serial-time division multiplexer 100 in accordance with the present invention.

FIG. 2 shows a block diagram that illustrates an isochronous serial-time division multiplexer 100 in accordance with the present invention. As described in greater detail below, multiplexer 100 routes isochronous data without buffering the data in a random-access memory by utilizing a plurality of selectors that each select predetermined time slots from a plurality of incoming isochronous data streams, and a control stage to control the time slots selected.

As shown in FIG. 2, multiplexer 100 includes a plurality of selectors SEL1–SELm, where m is an integer, that each receive a plurality of incoming streams of isochronous data IN1–INn, where n is an integer. Each of the incoming streams IN1–INn are organized into a continuous series of frames which each include a series of time slots or "channels". The time slots are repeated in each frame so that each frame includes a first through a last time slot.

Each time slot, in turn, defines a window for transmitting data. Thus, the data from each of a plurality of isochronous data sources can be transmitted over a single transmission line at essentially the same time by allocating one or more time slots in each frame to each of the data sources, depending on the bandwidth required by each source, as long as the combined data rate of the sources does not exceed the rate that data is being transmitted over the transmission line.

As further shown in FIG. 2, each selector SEL1–SELm requires that the time slots in each of the incoming streams IN1–INn be synchronized to the corresponding time slots in the remainder of the incoming streams IN1–INn so that a series of time slot groups are sequentially input to each of the selectors SEL1–SELm. As a result, each of the first time slots in each of the incoming streams IN1–INn are input at the same time, each of the second time slots are input at the same time, and each of the third time slots are input at the same time.

In operation, each selector SEL1–SELm selects one of the time slots from one of the incoming streams IN1–INn from each group of time slots in response to one of a plurality of selection codes SC. Thus, for example, one of the selectors SEL1–SELm can select the first time slot from stream IN1, the second time slot from stream IN4, and the third time slot from stream IN2, while another of the selectors SEL1–SELm can select the first time slot from stream IN2, the second time slot from stream IN4, and the third time slot from stream IN1. As a result, the data sink attached to selector SEL1, for example, can receive data from several different data streams IN1–INn.

The plurality of selectors SEL1–SELm output the data from the selected time slots as a corresponding plurality of outgoing streams of isochronous data OUT1–OUTm where each selector SEL1–SELm outputs one of the outgoing streams OUT1–OUTm. Each outgoing stream, in turn, is also organized into a continuous series of frames which each include a series of time slots.

In the present invention, the data from each selected input time slot is output in a corresponding output time slot. As a result, the data contained within the first time slot selected by selector SEL1 is output by selector SEL1 in the first time slot of outgoing stream OUT1, while the data contained within the second time slot selected by selector SEL1 is output in the second time slot of outgoing stream OUT1. Similarly, the data contained within the first and second time slots selected by selector SEL2 is output by selector SEL2 in the first and second time slots, respectively, of outgoing stream OUT2.

The disadvantage of utilizing a direct one-to-one mapping scheme, i.e., the first input time slot becomes the first output time slot, is that the data sources and sinks which output and receive the data must be capable of being programmed to accommodate these restrictions.

Thus, if a data source can only transmit in time slots 2, 4, and 6 of each frame, then a data sink must be capable of receiving this data during the second, fourth, and sixth time slots. Alternately, if a data sink can only receive data during the second, fourth, and sixth time slots, the data source must be capable of outputting data during these time slots.

The advantage of the present invention, however, is that by utilizing a one-to-one mapping scheme, the input and output random-access-memories (RAMs) which are required by conventional time division switches can be eliminated. This is a significant savings since, as stated above, both of these RAMs must be capable of storing a full frame of data from each of the incoming streams of isochronous data. In addition, elimination of these RAMs greatly simplifies the circuitry required to multiplex the data received from the incoming streams IN1–INn.

Referring back to FIG. 2, multiplexer 100 also includes a connection memory 110 that stores the plurality of selection codes SC for each selector SEL1–SELm, and transmits one of the selection codes SC for each selector SEL1–SELm each time one of a plurality of request signals REQ and one of a plurality of time slot group addresses ADD are received. As shown in FIG. 2, the time slot group address ADD is transmitted via a bus 142.

In the present invention, each selection code SC for each selector SEL1–SELm corresponds to one group of time slots. Thus, for example, the first selection code for selector SEL1 identifies which of the first time slots will be selected by selector SEL1, while the second selection code for selector SEL1 identifies which of the second time slots will be selected by selector SEL1.

In the preferred embodiment, all of the selection codes SC for each selector SEL1–SELm for each group of time slots are stored as an x-bit parallel selection code word SCW. Thus, the first selection codes for selectors SEL1–SELm form a first word, the second selection codes for selectors SEL1–SELm form a second word, and the third selection codes for selectors SEL1–SELm form a third word.

For example, if each of five selectors has a three-bit selection input for selecting a time slot from one of the eight incoming steams of data IN1–INn, then a 15-bit parallel selection code word will contain all of the information required by each of the five selectors to select a time slot from one of the eight sources. If each frame, in turn, has z time slots, where z is an integer, then a connection memory which can store z×15 bits can store all of the selection code words SCW required for one frame of time slots.

In addition, if each frame has z time slots, then bus 142 must be at least $2^W$ bits wide, where W represents the width of the bus, to identify each of the time slot groups. For example, if 256 time slots are in each frame, the bus 142 must be at least 8 bits wide.

Referring again to FIG. 2, multiplexer 100 additionally includes a control stage 120 that outputs a request signal REQ and a time slot group address ADD that correspond to each group of time slots, and latches the selection codes SC output by the connection memory 110 in response to the request signal REQ and the time slot group address ADD so that each selector SEL1–SELm receives a selection code SC that corresponds to the group of time slots being received.

In the preferred embodiment, control stage 120 utilizes a timing generator 130 to output a slot enable signal SEN which is substantially equivalent to the timing of the series of time slots. By then aligning each series of time slots with the slot enable signal SEN, the slot enable signal SEN can be utilized to identify each of the time slots in each of the incoming streams.

In addition, timing generator 130 also generates and transmits the time slot group addresses ADD so that each time slot group address ADD is transmitted as a preceding time slot group is received. This allows the time slot group address ADD time to settle at the inputs of connection memory 110 before the request signal REQ is received.

Control stage 120 also utilizes a series of first and second latches FL1–FLm and SL1–SLm, respectively, to hold and provide the selection codes SC to the selectors SEL1–SELm, and a controller 140 to control the latching of the selection codes SC.

Figure 3:
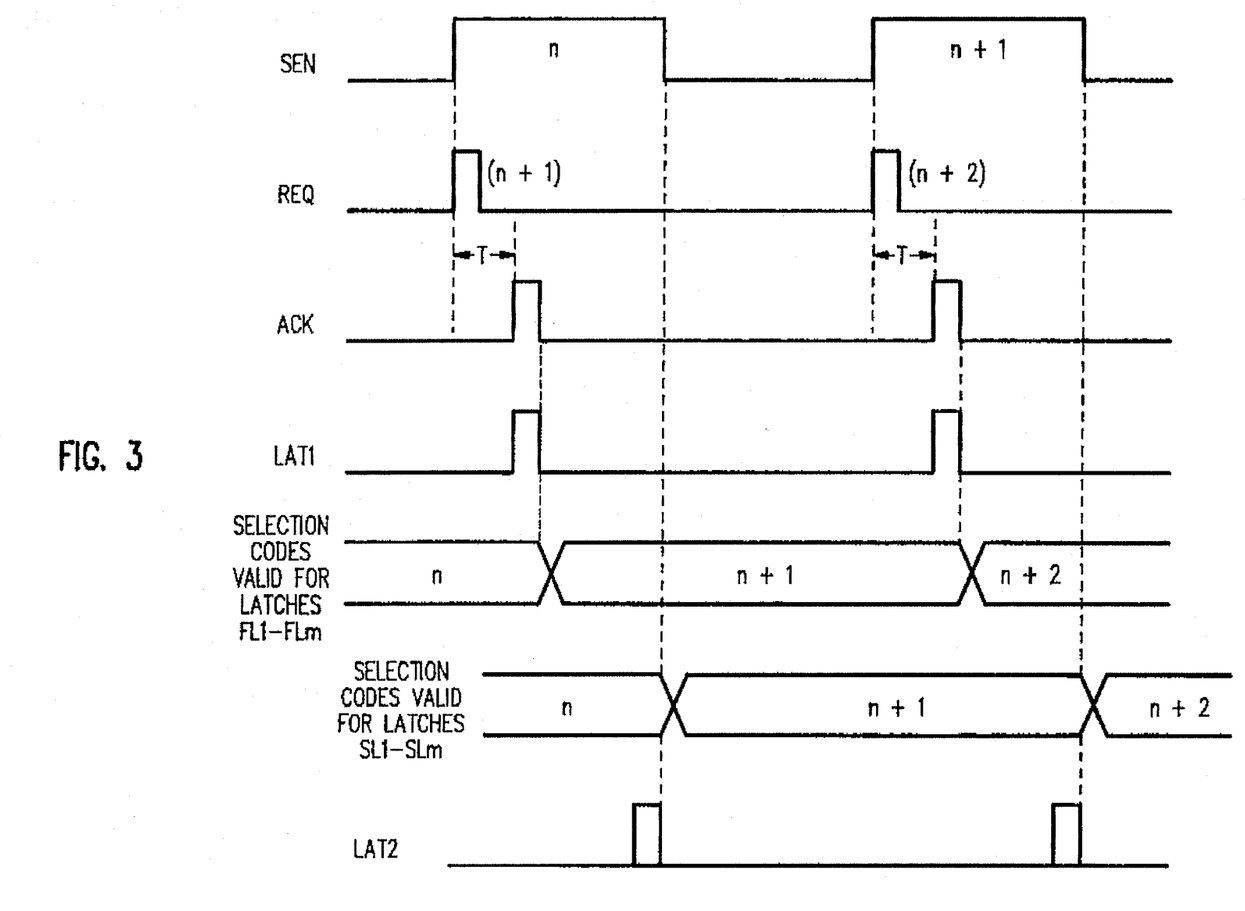
FIG. 3 is a timing diagram illustrating the operation of control silage 120.

FIG. 3 shows a timing diagram that illustrates the operation of control stage 120. As shown in FIGS. 2 and 3, controller 140 outputs the request signal REQ on the rising edge of the slot enable signal SEN which, as stated above, identifies each of the time slots in the frame. In the embodiment illustrated in FIG. 2, each request signal REQ is utilized to control the latching of the selection codes SC for the following time slot.

Thus, as shown in FIG. 3, the request signal REQ that controls the $n+1^{st}$ time slot is generated on the rising edge of the timing pulse that identifies the $n^{th}$ time slot. Similarly, the request signal REQ that controls the $n+2^{nd}$ time slot is generated on the rising edge of the timing pulse that identifies the $n+1^{st}$ time slot.

After an access time T, connection memory 110 outputs an acknowledge signal ACK which indicates that the selection code word SCW for the $n+1^{st}$ time slot is valid. Controller 140 then issues the first latch signal LAT1 in response to the acknowledge signal ACK. Alternately, the acknowledge signal ACK can be utilized as the first latch signal LAT1. As shown in FIG. 2, each of the first series of latches FL1–FLm then latch a portion, i.e., three bits, of the selection code word.

Referring to FIG. 3, controller 140 issues the second latch signal LAT2 one clock before the falling edge of the slot enable signal SEN. Thus, as shown in FIG. 2, each second latch SL1–SLm, which is connected to a corresponding first latch FL1–FLm and a corresponding selector SEL1–SELm, latches the selection code SC latched by the corresponding first latch FL1–FLm in response to the second latch signal LAT2. As a result, the selection codes SC for the $n+1^{st}$ time slot are presented to each of the selectors SEL1–SELm after the $n^{th}$ time slot has ended and before the $n+1^{st}$ time slot has begun.

As stated above, the series of time slots from each of the incoming streams IN1–INn are aligned to the slot enable signal SEN which, in turn, is utilized by controller 140 to represent the timing of each series of time slots. One technique for aligning the series of time slots to the slot enable signal SEN is to enable the data sources each time data from the data sources is expected in a particular time slot.

Figure 4:
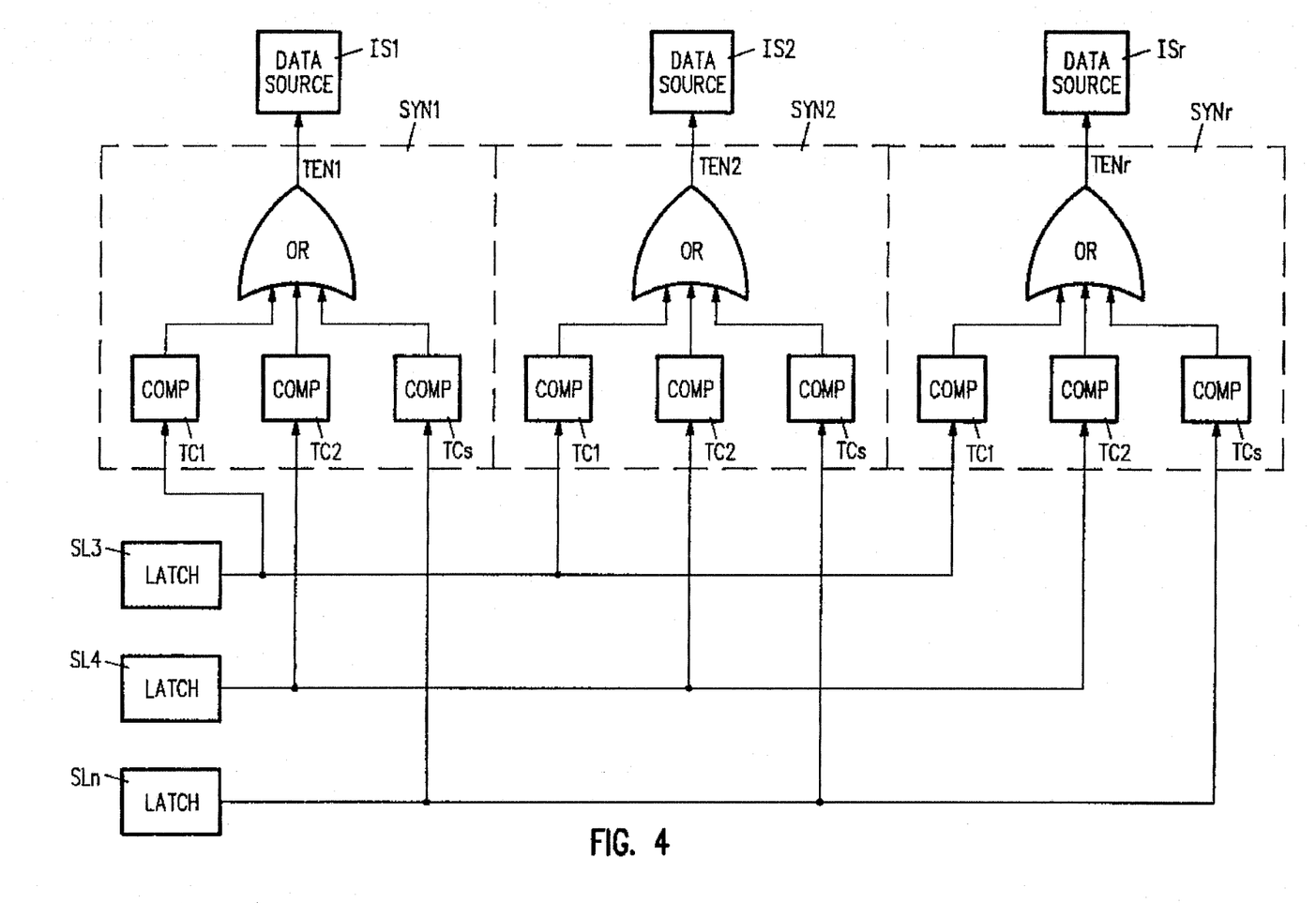
FIG. 4 is a block diagram illustrating a series of synchronization circuits SYN1–SYNr that enable a corresponding series of isochronous data sources IS1–ISr with a corresponding series of transmit enable signals TEN1–TENr each time data is expected from the data sources IS1–ISr.

FIG. 4 shows a block diagram that illustrates a series of synchronization circuits SYN1–SYNr, where r is an integer, that enable a corresponding series of isochronous data sources IS1–ISr with a corresponding series of transmit enable signals TEN1–TENr each time data is expected from the data sources IS1–ISr. As shown in FIG. 4, each synchronization circuit SYN1–SYNr includes a series of transmit comparators TC1–TCs, where s is an integer, that are each connected to one of the second latches SL1–SLm, and a logical OR gate which is connected to the outputs of each of the comparators TC1–TCs and a corresponding data source IS1–ISr.

In operation, each transmit comparator TC1–TCs compares the selection code SC latched by one of the second latches SL1–SLm to the selection code SC that represents the corresponding data source IS1–ISr. Thus, as shown in FIG. 4, if data source IS1 is identified by a selection code of 0-0-1, then comparator TC1 of synchronization circuit SYN1 compares the selection codes SC latched by second latch SL3 to the 0-0-3 code, comparator TC2 of synchronization circuit SYN1 compares the selection codes SC latched by second latch SL4 to the 0-0-1 code, while comparator TCs of synchronization circuit SYN1 compares the selection codes SC latched by second latch SLm to the 0-0-1 code.

When the selection codes input to one of the comparators TC1–TCs match, that comparator TC1–TCs outputs a match signal which causes the logical OR gate to output the corresponding transmit enable signal TEN1–TENr. Thus, for example, when the comparison indicates that the selection code SC held by second latch SL1 matches the selection code SC of data source IS1, the logical OR gate outputs transmit enable signal TEN1.

As a result, by synchronizing the timing of the data sources IS1–ISr with the timing of the transmit enable signals TEN1–TENr, the data sources IS1–ISr can be configured to output data in a time slot that corresponds with the timing of the slot enable signal SEN.

Figure 5:
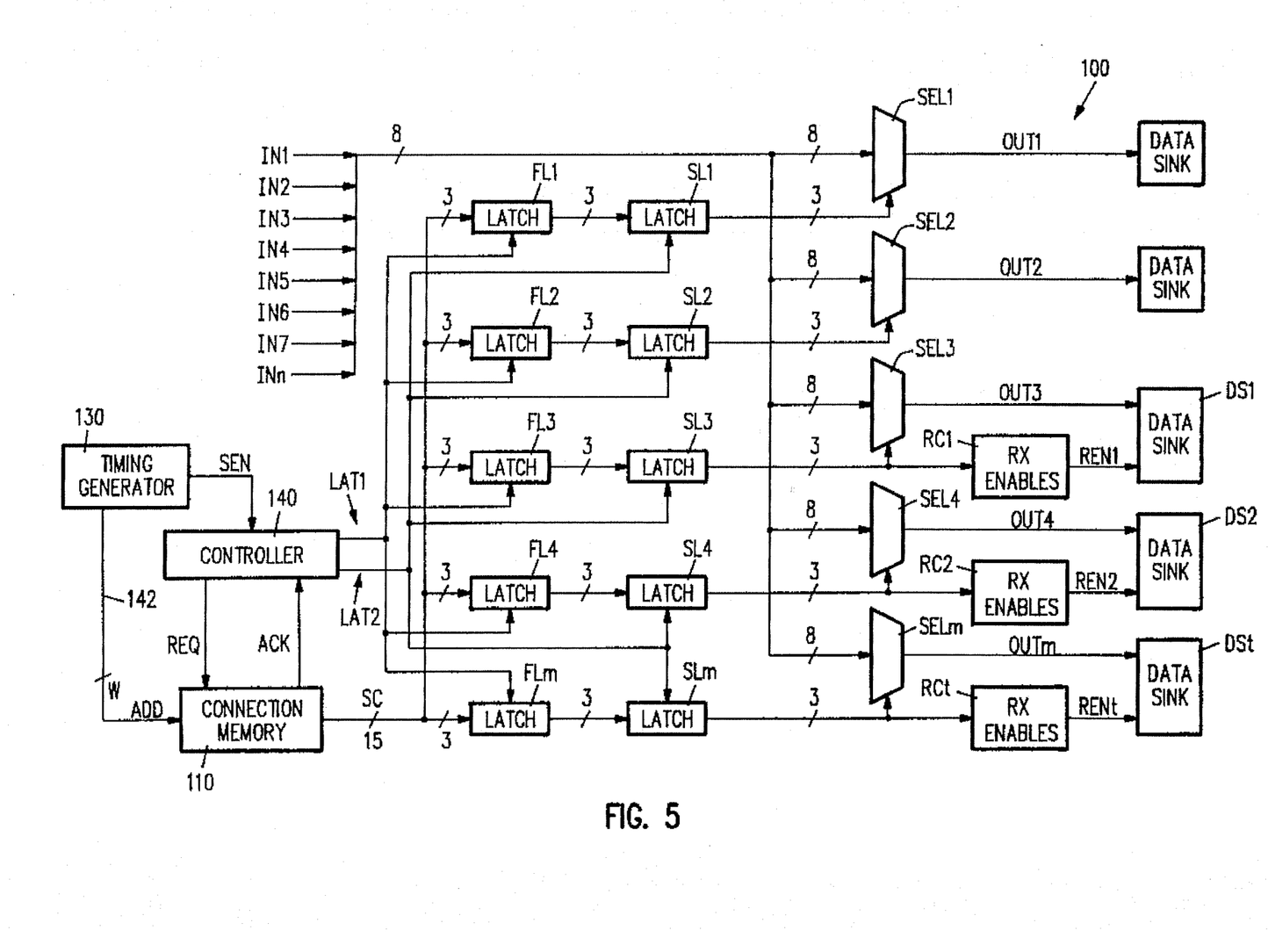
FIG. 5 is a block diagram illustrating a series of receive comparators RC1–RCt that enable a corresponding series of isochronous data sinks DS1–DSt with a corresponding series of receive enable signals REN1–RENt each time data is expected by the data sinks DS1–DSt.

In addition to outputting transmit enable signals, multiplexer 100 can also be configured to output receive enable signals. FIG. 5 shows a block diagram that illustrates a series of receive comparators RC1–RCt, where t is an integer, that enable a corresponding series of isochronous data sinks DS1–DSt with a corresponding series of receive enable signals REN1–RENt each time data is expected by the data sinks DS1–DSt. As shown in FIG. 5, each of the series of receive comparators RC1–RCt are also connected to one of the second latches SL1–SLm in addition to being connected to one of the data sinks DS1–DSt.

In operation, the receive comparators RC1–RCt generate a receive enable signal REN–RENt each time a selector SEL1–SELm receives a selection code SC unless the selection code SC indicates that there is nothing to transfer to the data sinks.

For example, in the preferred embodiment, one of the incoming streams IN1 includes a null source, i.e., the input is connected to ground. Thus, the receive comparators RC1–RCt compare the selection codes SC latched by its corresponding second latch SL1–SLm to the selection code SC that represents the null source IN1. Thus, as shown in FIG. 5, if the null source IN1 is identified by a selection code of 0-0-0, then each of the selection codes SC latched by the second latches are compared to the 0-0-0 code.

When the comparison indicates that the selection codes match, the corresponding receive enable signal REN1–RENt is disabled. Thus, for example, when the selection code SC latched by second latch SL3 matches the 0-0-0 code, receive comparator RC1 disables the receive enable signal REN1. As a result, each data sink DS can be notified that a time slot will be transmitted to that data sink DS.

Figure 6:
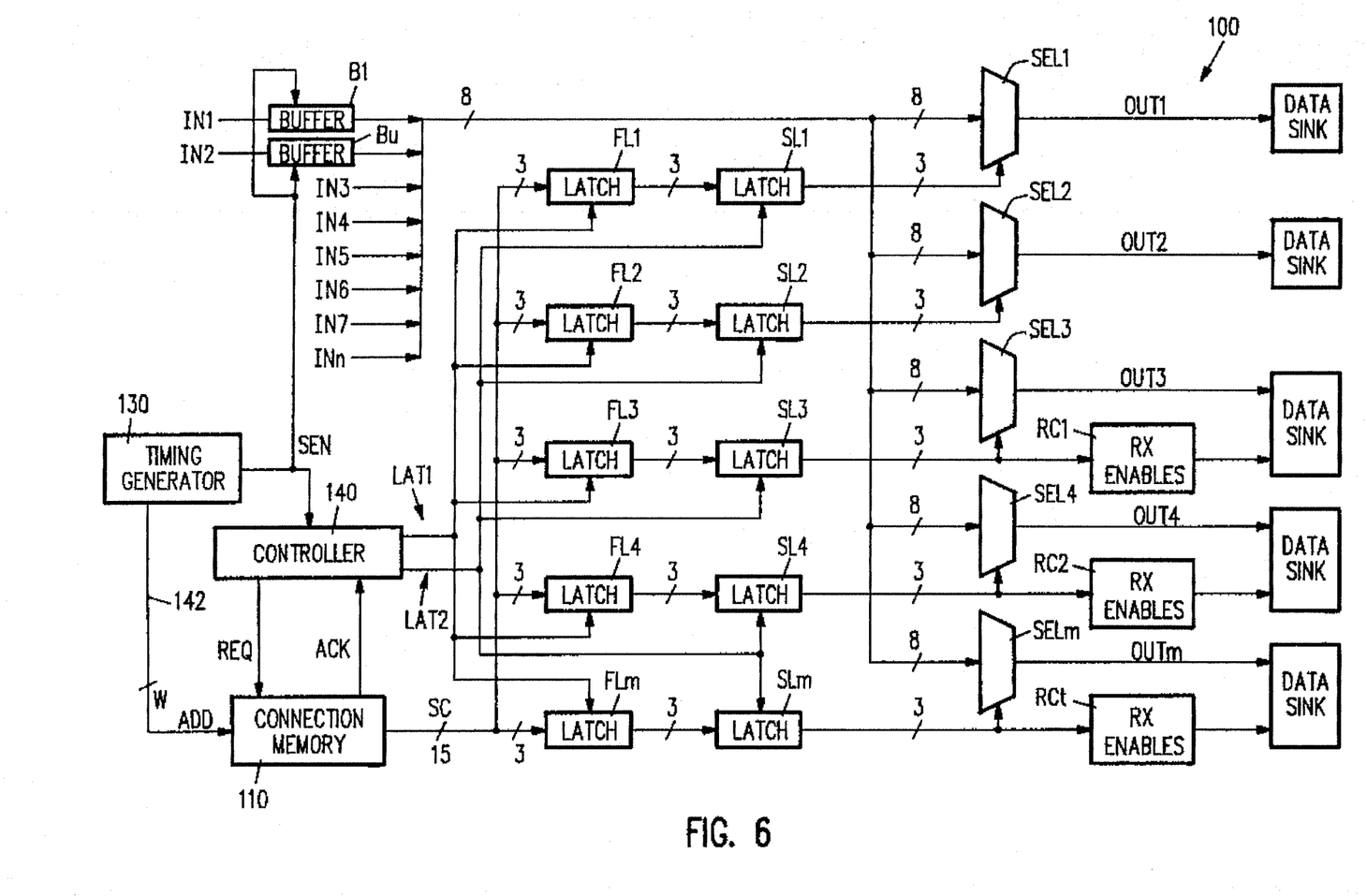
FIG. 6 is a block diagram illustrating a series of buffers B1–Bu in accordance with the present invention.

In addition to utilizing transmit enable signals to synchronize the time slots to the slot enable signal SEN, the time slots of the incoming streams IN1–INn can be buffered and then synchronized to the slot enable signal SEN. FIG. 6 shows a block diagram that illustrates a series of buffers B1–Bu, where u is an integer, in accordance with the present invention.

In operation, as shown in FIG. 6, each buffer B1–Bu receives one of the incoming streams IN1–INn and the slot enable signal SEN, and outputs the time slots so that the first time slots of all of the incoming streams IN1–INn are input to selectors SEL1–SELm at the same time.

Although the incoming streams IN1–INn have been described in terms of isochronous data streams, the incoming streams IN1–INn can also represent other signals. For example, one of the incoming streams IN1–INn can be a zero signal, i.e., connected to ground, as well as a constant A or a constant B signal for transmitting defined data patterns.

It should be understood that various alternatives to the embodiment of the invention described herein may be employed in practicing the invention. It is intended that the following claims define the scope of the invention and that methods and structures within the scope of these claims and their equivalents be covered thereby.

What is claimed is:

1. An isochronous serial time division multiplexer for routing data from an isochronous data source to an isochronous data sink, the multiplexer comprising:

a plurality of selectors, wherein each selector receives a series of time slots from each of a plurality of incoming streams of data, and a corresponding series of selection codes that each identify a time slot from the series of time slots from an incoming stream of data, and passes the time slot identified by each selection code;

a connection memory that stores the series of selection codes for each selector, receives a request signal and a series of selection code addresses that each identify a selection code for each selector, and outputs the selection code for each selector identified by each selection code address in response to the request signal; and a control stage that outputs the request signal and the series of selection code addresses so that each selection code for each selector output by the connection memory identifies a time slot from the series of time slots from an incoming stream of data.

2. The multiplexer of claim 1 wherein each of the series of time slots has a substantially equal time slot period; and wherein the control stage comprises:

a timing generator that outputs a slot enable signal having a period substantially equal to a time slot period, and a selection code address during every time slot period;

a plurality of first latches, each first latch responding to a first latch signal by latching the selection code output from the connection memory that corresponds to one of the selectors;

a plurality of second latches, each second latch being connected to a corresponding first latch and a corresponding selector, and responding to a second latch signal by latching the selection code latched by the corresponding first latch; and a controller that outputs the request signal in response to the slot enable signal, the first latch signal each time the connection memory outputs a selection code for each of the selectors, and the second latch signal a time after outputting the first latch signal.

3. The multiplexer of claim 2 and further comprising a plurality of buffers, each buffer receiving an incoming stream of data and the slot enable signal, and outputting said incoming stream of data so that said incoming stream of data is aligned with the slot enable signal.

4. The multiplexer of claim 1 wherein the connection memory outputs one selection code for each selector as a single selection code word.

5. The multiplexer of claim 1 wherein the selection codes for each selector are stored in the connection memory in a predetermined sequence that determines which time slot is passed from an incoming stream of data.

6. The multiplexer of claim 1 and further comprising a plurality of synchronization circuits connected to the second latches, each synchronization circuit enabling a corresponding data source to transmit data during a predetermined time slot each time data is expected from the corresponding data source.

7. The multiplexer of claim 5 wherein each synchronization circuit comprises:

a plurality of transmit comparators connected to a corresponding plurality of second latches, each transmit comparator comparing the selection code held by the corresponding second latch with the selection code that represents the data source that corresponds with said synchronization circuit, and outputting a match signal when the comparison indicates a match; and a logical OR gate connected to the plurality of transmit comparators that outputs a transmit enable signal in response to the match signal.

8. The multiplexer of claim 1 and further comprising a plurality of receive enable comparators connected to a corresponding plurality of second latches and a corresponding plurality of selectors, wherein said corresponding plurality of selectors is connected to a corresponding plurality of data sinks, each receive enable comparator comparing the selection code held by the corresponding second latch with a selection code that indicates that no data is to be transferred, and outputting a receive enable signal when the comparison indicates no match.

9. The multiplexer of claim 1 wherein each of the series of time slots has a substantially equal time slot period; and wherein the control stage comprises:

a timing generator that outputs a slot enable signal with a period substantially equal to a time slot period, and a selection code address during every time slot period;

a plurality of first latches, each first latch responding to a first latch signal by latching the selection code output from the connection memory that corresponds to one of the selectors;

a plurality of second latches, each second latch being connected to a corresponding first latch and a corresponding selector, and responding to a second latch signal by latching the selection code latched by the corresponding first latch; and a controller that outputs the first latch signal each time the connection memory outputs a selection code for each of the selectors, and the second latch signal a time after outputting the first latch signal.

10. The multiplexer of claim 1 and further comprising a synchronization circuit connected to a second latch, the synchronization circuit enabling a corresponding data source to transmit data during a predetermined time slot each time data is expected from the corresponding data source.

11. The multiplexer of claim 1 and further comprising a plurality of buffers, each buffer receiving an incoming stream of data and the slot enable signal, and outputting said incoming stream of data so that said incoming stream of data is aligned with the slot enable signal.

12. A method for routing data from an isochronous data source to an isochronous data sink, the method comprising the steps of:

receiving a series of time slots from each of a plurality of incoming streams of data, and a corresponding series of selection codes that each identify a time slot from the series of time slots from an incoming stream of data;

passing the time slot identified by each selection code;

storing the plurality of selection codes; and outputting a selection code from the series of selection codes identified by a selection code address in response to a request signal.

13. An isochronous serial time division multiplexer for routing data from an isochronous data source to an isochronous data sink, the multiplexer comprising:

a selector that receives a series of time slots from each of a plurality of incoming streams of data, and a corresponding series of selection codes that each identify a time slot from the series of time slots from an incoming stream of data, and passes the time slot identified by each selection code;

a connection memory that stores the series the selection codes, receives a request signal and a series of selection code addresses that each identify a selection code in the series of selection codes, and outputs the selection code identified by each selection code address in response to the request signal; and a control stage that outputs the request signal and the series of selection code addresses so that each selection code output by the connection memory identifies a time slot from an incoming stream of data.

14. The multiplexer of claim 13 wherein the series of time slots have substantially equal time slot periods; and wherein the control stage comprises:

a timing generator that outputs a slot enable signal having a period substantially equal to a time slot period, and a selection code address during every time slot period;

a first latch that latches the selection code output from the connection memory that corresponds in response to a first latch signal;

a second latch connected to the first latch and the selector that latches the selection code latched by the first latch in response to a second latch signal; and a controller that outputs the request signal in response to the slot enable signal, the first latch signal each time the connection memory outputs one of the selection codes, and a second latch signal a time after outputting the first latch signal.

15. The multiplexer of claim 14 and further comprising a synchronization circuit connected to the second latch, the synchronization circuit enabling a corresponding data source to transmit data during a predetermined time slot each time data is expected from the corresponding data source.

16. The multiplexer of claim 13 wherein each of the series of time slots has a substantially equal time slot period; and wherein the control stage comprises:

a timing generator that outputs a slot enable signal having a period substantially equal to a time slot period, and a selection code address during every time slot period;

a first latch that latches the selection code output from the connection memory in response to a first latch signal;

a second latch connected to the first latch and the selector that latches the selection code latched by the first latch in response to a second latch signal; and a controller that outputs the first latch signal each time the connection memory outputs one of the selection codes, and a second latch signal a time after outputting the first latch signal.

17. The multiplexer of claim 16 and further comprising a synchronization circuit connected to the second latch, the synchronization circuit enabling a corresponding data source to transmit data during a predetermined time slot each time data is expected from the corresponding data source.

18. The multiplexer of claim 16 and further comprising a receive enable comparator connected to a second latch and the selector, wherein said selector is connected to a data sink, the receive enable comparator comparing the selection code held by the second latch with a selection code that indicates that no data is to be transferred, and outputting a receive enable signal when the comparison indicates no match.

19. The multiplexer of claim 13 and further comprising a plurality of buffers, each buffer receiving an incoming stream of data and the slot enable signal, and outputting said incoming stream of data so that said incoming stream of data is aligned with the address enable signal.

* * * * *